United States Patent
Domingo (10) Patent No.: US 10,393,327 B2
(45) Date of Patent: Aug. 27, 2019

(54) LUMEN WAND

(71) Applicant: Joseph F. Domingo, Elmhurst, IL (US)

(72) Inventor: Joseph F. Domingo, Elmhurst, IL (US)

(*) Notice: Subject to any disclaimer, the term of this patent is extended or adjusted under 35 U.S.C. 154(b) by 0 days.

(21) Appl. No.: 15/456,217

(22) Filed: Mar. 10, 2017

(65) Prior Publication Data

US 2017/0276304 A1   Sep. 28, 2017

Related U.S. Application Data (60) Provisional application No. 62/311,680, filed on Mar. 22, 2016.

(51) Int. Cl.
| | | |
|---|---|---|
| A45B 3/02 | (2006.01) | |
| F21L 4/08 | (2006.01) | |
| F21V 5/04 | (2006.01) | |
| F21V 23/04 | (2006.01) | |
| F21V 23/00 | (2015.01) | |
| F21V 21/08 | (2006.01) | |
| F21V 8/00 | (2006.01) | |
| F21V 21/40 | (2006.01) | |
| G02B 6/00 | (2006.01) | |
| F21Y 115/10 | (2016.01) | |

(Continued)

(52) U.S. Cl.
CPC .............. *F21L 4/08* (2013.01); *F21V 5/04* (2013.01); *F21V 21/08* (2013.01); *F21V 21/406* (2013.01); *F21V 23/003* (2013.01); *F21V 23/0414* (2013.01); *G02B 6/00* (2013.01); *G02B 6/0001* (2013.01); *F21W 2111/10* (2013.01); *F21Y 2115/10* (2016.08); *G08G 5/065* (2013.01)

(58) Field of Classification Search
CPC ...... F21L 4/08; F21V 21/0965; F21V 21/406; F21V 21/08; F21V 5/04; F21V 7/22; F21V 23/003; F21V 23/0414; F21V 23/0084; G08G 5/06; G02B 6/0001; F21Y 2115/10; F21W 2111/06; A45B 3/02; A45B 3/04
USPC .................. 362/102, 109, 157, 202; 123/910
See application file for complete search history.

(56) References Cited

U.S. PATENT DOCUMENTS

| | | | | |
|---|---|---|---|---|
| 3,443,084 A | * | 5/1969 | Jammet | F21L 15/00 362/189 |
| 3,821,860 A | * | 7/1974 | Patty | G09F 13/16 340/321 |

(Continued)

FOREIGN PATENT DOCUMENTS

| | | |
|---|---|---|
| CN | 204254295 | 4/2015 |
| JP | 2004073860 A * | 3/2004 |

OTHER PUBLICATIONS

Espacenet English translation of reference JP 2004073860 A.*

(Continued)

*Primary Examiner* — Sean P Gramling
*Assistant Examiner* — Omar Rojas Cadima
(74) *Attorney, Agent, or Firm* — Lempia Summerfield Katz LLC (57) ABSTRACT

A lumen wand includes a wand portion formed of a transparent or semi-transparent material having a paddle-like shape with a thickness, a length, and a width. The thickness is substantially less than at least the length. A grip is coupled to one end of the wand portion. An illumination element is configured to emit light into a proximal edge of the wand portion at the one end. The emitted light is propagated by the wand portion such that light is emitted from surfaces of the wand portion other than the proximal edge.

20 Claims, 4 Drawing Sheets

(51) Int. Cl.
*G08G 5/06* (2006.01)
*F21W 111/10* (2006.01)

(56) References Cited

U.S. PATENT DOCUMENTS

| | | | |
|---|---|---|---|
| 3,970,033 | A | 7/1976 | Lindner et al. |
| 5,276,591 | A | 1/1994 | Hegarty |
| 5,806,961 | A * | 9/1998 | Dalton .................. F21L 4/025 |
| | | | 362/183 |
| 6,204,777 | B1 | 3/2001 | Lyons |
| 6,293,678 | B1 * | 9/2001 | Schieferstein ............ B64F 1/18 |
| | | | 340/947 |
| 6,776,579 | B2 | 8/2004 | Shiratori et al. |
| 8,021,009 | B2 | 9/2011 | Knoll et al. |
| 9,857,520 | B2 | 1/2018 | Parker et al. |
| 2004/0137189 | A1 | 7/2004 | Tellini |
| 2008/0272714 | A1 * | 11/2008 | Noble .................. F21L 4/027 |
| | | | 315/292 |
| 2010/0197148 | A1 * | 8/2010 | Rudisill .............. H01R 11/30 |
| | | | 439/40 |
| 2011/0075440 | A1 | 3/2011 | Wang |
| 2011/0199757 | A1 | 8/2011 | Cheng |
| 2012/0057334 | A1 * | 3/2012 | Robinson ............... F21L 4/022 |
| | | | 362/191 |
| 2012/0163022 | A1 | 6/2012 | Bakker |
| 2012/0268966 | A1 | 10/2012 | McCollum |
| 2012/0275142 | A1 | 11/2012 | Lundy |
| 2013/0051061 | A1 * | 2/2013 | Yoo ........................ F21V 17/12 |
| | | | 362/559 |
| 2016/0356439 | A1 * | 12/2016 | Inskeep ................ H02J 7/0052 |

OTHER PUBLICATIONS

Triangle Shaped Hand Fan, Inkhead.com; https://www.inkhead.com/triangle-hand-fan/9471; Apr. 20, 2012.

2-Sided Hand-Held Stop-Slow Sign, STOPSignsAndMore.com; Sep. 5, 2015; http://stopsignsandmore.com/p-84-2-sided-handheld-stop-slow-sign-18×18.aspx; 2 pages.

ISR dated Jun. 2, 2017, International Search Report and Written Opinion cited in the corresponding PCT Application No. PCT/US2017/021919; dated Jun. 2, 2017; 11 pages.

* cited by examiner

FIG. 8

LUMEN WAND

RELATED APPLICATION DATA

This patent is related to and claims priority benefit of U.S. provisional application Ser. No. 62/311,680 filed Mar. 22, 2016 and entitled "Marshalling Wand." The entire contents of this prior filed provisional application is hereby incorporated herein by reference.

BACKGROUND

1. Field of the Disclosure

The invention is generally related to marshalling wands, and more particularly to a marshalling wand having a wand portion with a relatively flat profile and a handle portion constructed to illuminate the wand portion.

2. Description of Related Art

Marshalling wands are known in the art. Marshalling wands are used by airport personnel on the tarmac to provide direction for pilots as aircraft taxi from the runways to the gates and from the gates to the runways. Marshalling wands are also used by law enforcement, military, crowd control, and other similar personnel when directing traffic, such as in roadside emergencies and the like, or when directing large groups of people.

A conventional marshalling wand has a grip at one end and a hollow translucent plastic cone at the other end. A light source at the grip end emits light into the interior of the hollow cone to illuminate the cone. In many instances, the cone is a simple orange plastic construction. The typical marshalling wand cone may have a relatively larger diameter at the proximal end near the grip and may have a relatively smaller diameter at the distal end away from the grip.

The typical marshalling wand is relatively bulky in size and often uses a flashlight as the grip. The cone is often attached in a rudimentary manner to the flashlight. The batteries and the bulbs often expire relatively quickly. Also, the typical marshalling wand can be quite heavy so that it can be tiring for a user to hold and utilize one or two marshalling wands over extended periods of time.

Others have tried to address problems with these known marshalling wands. In one example, marshalling wands and other similar devices have been developed that use a luminescent material on the wand portion instead of employing an actively lit wand portion. A luminescent material, when exposed to light for a period of time, will be visible in the dark (i.e., "glow in the dark"). In one example, a marshalling wand was created that utilized a cone portion with a luminescent coating. By day, the wand is visible because the user is also visible. By night, the wand is visible as a result of the luminescent cone on the wand. See, for example, U.S. Publication No. 2004/0179352.

In another example, a traffic wand was created having a handle at one end and a relatively flat paddle shaped wand extending from the handle. One face of the wand included an orange color to be visible by day and the other face of the wand included a luminescent or phosphorescent surface to be visible in low light conditions. See, for example, U.S. Pat. No. 6,561,119. These luminescent solutions have been found to be deficient in providing satisfactory illumination at night. The material is not particularly bright and the effect wears off over time. Further, the paddle solution of the '119 patent is not visible at night from the one side or on the edges of the flat paddle shaped wand portion. Thus, the user must be extremely diligent in properly orienting the device in order for the device to be useful at night.

SUMMARY

In one example according to the teachings of the present disclosure, a lumen wand includes a wand portion formed of a transparent or semi-transparent material having a paddle-like shape with a thickness, a length, and a width. The thickness is substantially less than at least the length. A grip is coupled to one end of the wand portion. An illumination element is configured to emit light into a proximal edge of the wand portion at the one end. The emitted light is propagated by the wand portion such that light is emitted from surfaces of the wand portion other than the proximal edge.

In one example, the lumen wand can have a power source disposed within the grip of the lumen wand.

In one example, the lumen wand can have a power source that includes a rechargeable battery. The rechargeable battery may be disposed within the grip of the lumen wand.

In one example, the illumination element can be disposed within the grip.

In one example, the illumination element can be a light emitting diode or LED.

In one example, the proximal edge of the wand portion can be adjacent the illumination element. The proximal edge can also be curved concavely relative to the illumination element to direct the emitted light from the illumination element in a plurality of directions into a body of the wand portion.

In one example, the lumen wand can also include a lens disposed between the proximal edge and the illumination element. The lens can be concave relative to the illumination element.

In one example, the lumen wand can include a switch disposed within the grip of the lumen wand. The switch can be configured to operate the illumination element.

In one example, the lumen wand can include an actuation mechanism. The actuation mechanism can have a switch, which may be coupled to an actuator that may be exposed to an exterior surface of the grip.

In one example, the lumen wand can include a microprocessor, which may be disposed within the grip. The microprocessor can be operably connected to the illumination element.

In one example, the lumen wand can include a body of the wand portion that is formed of a solid acrylic material.

In one example, at least a front surface and a rear surface of the wand portion can be modified to control an amount of the light emitted therefrom, a direction of the light emitted therefrom, or both the amount and the direction of the light emitted therefrom.

In one example, side edges of the wand portion can be modified to control the amount of the light emitted therefrom, the direction of the light emitted therefrom, or both the amount and the direction of the light emitted therefrom.

In one example, an applique layer of material can be applied to the front surface and the rear surface of the wand portion. The applique layer may be configured to omnidirectionally disperse the light emitted therefrom.

In one example, a 3M Diamond Grade Reflective Fluorescent Orange applique material can be adhered to the wand portion.

In one example, an applique layer, coating, or surface texture can be applied to at least a portion of the front surface and the rear surface of the wand portion.

In one example, an applique layer, coating, or surface texture can be applied to at least some of the surfaces of the wand portion. The applique layer, coating, or surface texture can define an intermittent pattern of openings on the wand portion.

In one example, the wand portion can be fabricated from a high-grade light pipe material that may be configured to reflect at least a portion of the emitted light from the illumination element along and within an interior of a body of the wand portion prior to the light being emitted from the wand portion.

In one example, the lumen wand can include a magnetic component carried on the grip and on the wand portion near a distal end thereof. The magnetic components can be configured to magnetically adhere the lumen wand to a second lumen wand of like construction.

In one example, the lumen wand can include: a) a microprocessor disposed within the grip, the microprocessor configured to control one or more functions of the lumen wand; b) a USB port carried by the grip; c) a charging chip disposed within the grip; d) a rechargeable battery disposed within the grip, the charging chip configured to control at least one aspect of recharging the rechargeable battery, the USB port configured to provide power to recharge the rechargeable battery; e) an actuation mechanism disposed at least in part within the grip, the actuation mechanism configured to control the illumination element; and f) a lens disposed between the illumination element and a proximal edge of the wand portion.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

The disclosed marshalling wands, i.e., lumen wands solve or improve upon one or more of the above-noted and/or other problems and disadvantages with prior known marshalling wands and traffic wands. In one example, the disclosed lumen wands utilize a light source and a relatively flat paddle-like wand portion. The light source can be provided within a handle portion or grip at one end of the wand portion. The light source can be a long lasting, low power consumption LED or other suitable light emitting element. Light is emitted from the light source into an edge of the wand portion, whereby the light propagates along the interior of the wand portion to be emitted from the side edges and the front and rear surfaces of the wand portion. In one example, the various surfaces of the wand portion can be treated or modified to control and/or enhance the light emitted from the wand portion. These and other objects, features, and advantages of the disclosed lumen wands will become apparent to those having ordinary skill in the art upon reading this disclosure.

Figure 1:
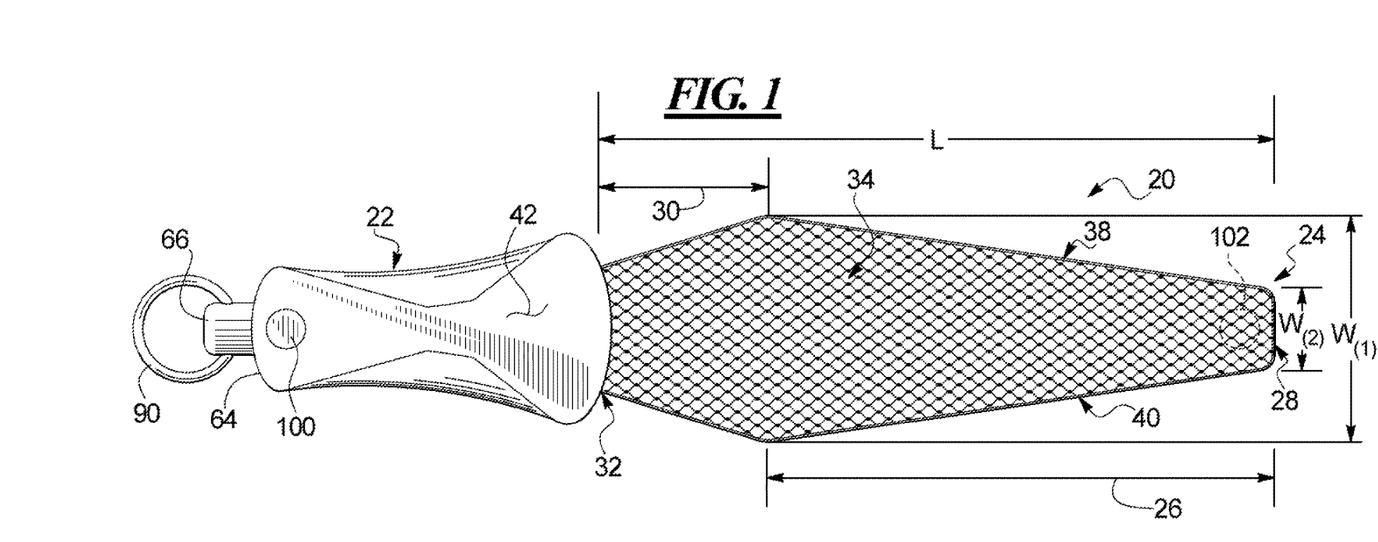
FIG. 1 shows a front plan view of one example of a lumen wand constructed in accordance with the teachings of the present disclosure.
Figure 2:
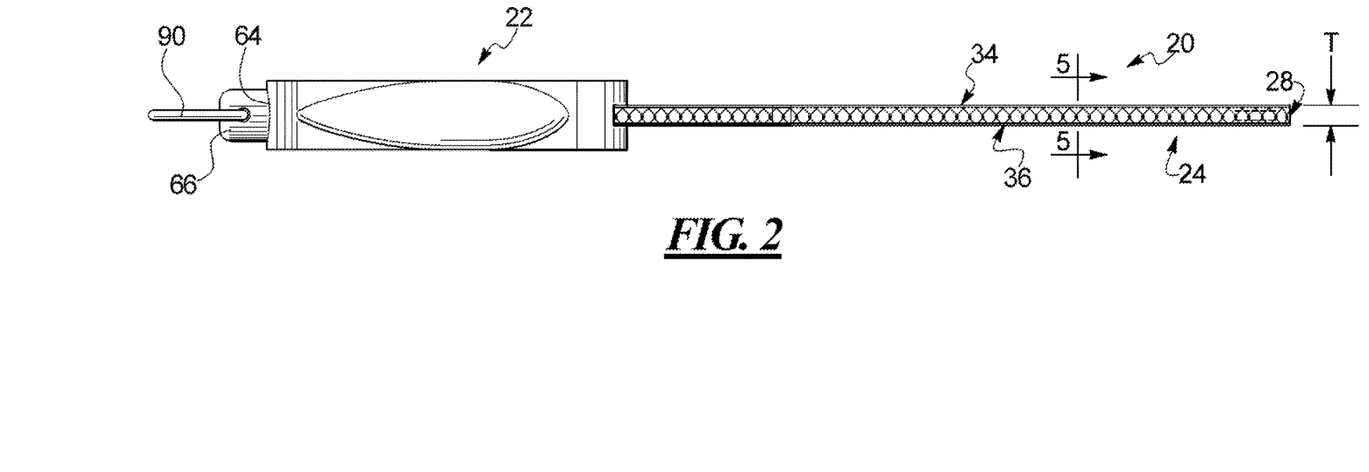
FIG. 2 shows a side view of the lumen wand of FIG. 1.

Turning now to the drawings, FIGS. 1 and 2 show one example of a marshalling wand or lumen wand 20 constructed in accordance with the teachings of the present disclosure. The disclosed device will be called a lumen wand hereinafter. However, the device may also be called a marshalling wand, a traffic control wand, or any other known name for such devices. In this example, the lumen wand 20 has a handle portion or grip 22 at one end of the lumen wand and a wand portion 24 at an opposite end of the lumen wand. The wand portion 24 can be formed having a paddle-like shape with a relatively thin thickness and a relatively wider length and width. In this example, the wand portion 24 has a relatively flat, frusto conical shaped body with a distal, longer segment 26 that tapers from a wider part nearer the grip 22 to a narrower part at a free end 28. The body also has a proximal, shorter segment 30 that reverse tapers (relative to the taper of the distal segment 26) from the wider width part of the distal segment to a narrower width proximal end 32 at the grip 22.

The wand portion 24 has a thickness T between a front surface 34 and a rear surface 36 of the relatively flat body as depicted in FIG. 2. There may be virtually no difference between the front and rear surfaces 34 and 36 and the nomenclature may be used solely to differentiate one from the other. The wand portion 24 also has a length L beyond the grip 22 to the free end 28 of the distal segment 26. The length of the wand portion 24 is defined by the combined lengths of the proximal segment 30 (beyond the grip 22) and the distal segment 26 of the body. The wand portion 24 also has a width W(n) defined between side edges 38 and 40 of the wand portion. The width W(n) of the wand portion 24 in this example varies over the length L. The width W(n) increases along the proximal segment 30 from the grip 22 to the point adjacent the distal segment 26. The width W(n) of the distal segment 26 then decreases from the point adjacent the proximal segment 30 to the free end 28. In this example, the thickness T is substantially less than at least the length L and is also substantially less than the width W(n).

In one example, the wand portion 24 can made of a non-colored, clear, i.e., transparent plastic material such as acrylic. In other examples, the material can be a light-pipe specific material, i.e., a higher-grade plastic or other material designed with particular light refracting and propagating characteristics tuned to the proportions, and particularly the thickness T, of the wand portion 24. The material need not be colorless, clear or transparent. Instead, the material can have a color or tint, such as orange, yellow, or red, and/or can be translucent to some degree. In the disclosed example, the wand portion 24 is a solid piece of material and functions similar to or as a light pipe as described further below. However, the lumen wand 20 could have a wand portion that includes a plurality of material layers joined together or that is a hollow structure with an open interior space between the various side edges 38, 40 and the front and rear surfaces 34, 36. The wand portion 24 may be made, for example, from transparent orange acrylic, translucent orange acrylic, fluorescent orange acrylic, or the like. The color, if any, need not be orange. The material need not be acrylic. If acrylic, the specific type and/or properties of the acrylic material can also vary. Also, depending on the intended application for the lumen wand 20, the material of the wand portion 24 may have a blue tint, a yellow tint, a red tint, an orange tint, a green tint, or the like.

In general, the lumen wand 20 is constructed so that, when it is illuminated, light is emitted from at least the front and rear surfaces 34, 36 of the body of the wand portion 24. The lumen wand 20 can also be constructed so that light is emitted from the exposed side edges 38 and 40 of the body. As described below, the surfaces on the wand portion 24 of the lumen wand 20 can be provided with characteristics and/or features that help to more evenly distribute the emitted light over the surfaces of the wand portion or that help to create or mimic a light-pipe effect, if the wand portion material is a conventional plastic material.

The grip 22 of the lumen wand 20 in this example is also shown in FIGS. 1 and 2. The grip 22 can be formed in one or more parts and can have a hollow interior cavity. In one example, the grip 22 has an ergonomic exterior shape designed to conform to a person's hand. The shape can vary from the disclosed shape illustrated in FIGS. 1 and 2. The grip 22 can also be formed of any suitable material or combinations of materials. For example, the grip 22 can be made from inexpensive plastic materials, rubber materials, or combinations thereof. An exterior surface 42 of the grip 22 can include a texture to improve appearance and/or grip friction, if desired. Alternatively, the grip 22 can be formed having a substantially rigid base substrate or inner structure, such as a hard, plastic shell. The grip 22 can also have a softer material layer, such as an elastomer, rubber, silicone, or the like, that is over-molded or otherwise applied to the base substrate to enhance grip friction and/or grip comfort.

Figure 3:
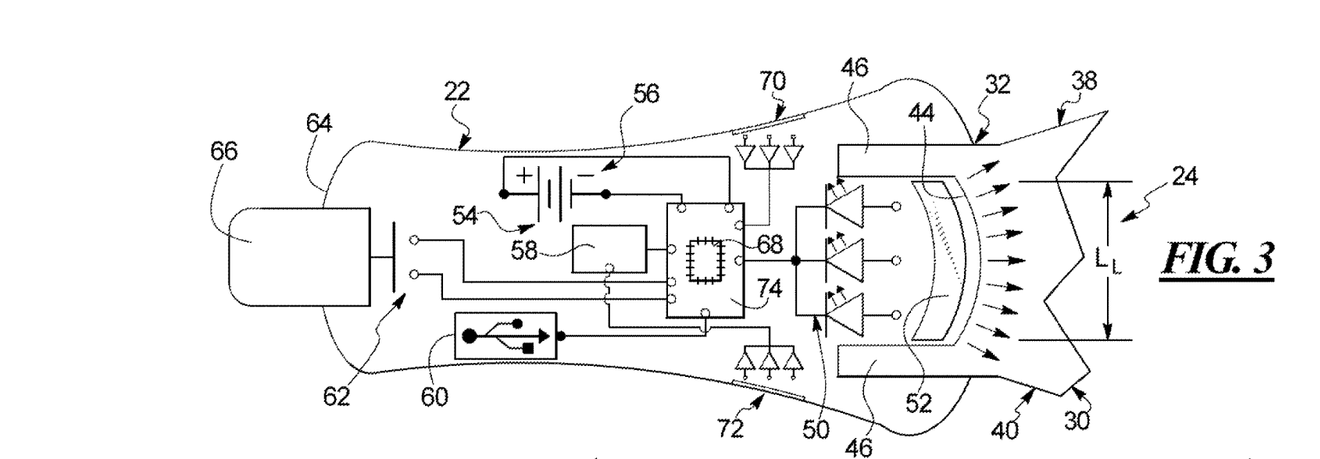
FIG. 3 shows a simplified schematic view of one example of the illumination and electronic components of a lumen wand constructed in accordance with the teachings of the present disclosure.

FIG. 3 shows a simplified schematic representation of the illumination and electronic components of the lumen wand 20. In this example, these components are housed with the handle portion or grip 22. Thus, to house, retain, and protect these components, the grip 22 can include a hard, plastic shell with a hollow cavity, as noted above.

The proximal segment 30 of the wand portion 30 in this example is connected to the grip 22. Referring to FIG. 3, the proximal segment 30 terminates at first or proximal edge 44 of the wand portion 24. The proximal edge 44 in this example faces into the cavity of the grip 22. The proximal edge 44 is disposed between two prongs 46 that extend from the proximal segment 30 into the grip 22. The prongs 46 are spaced apart and lengthwise oriented relative to the wand portion 24 and may be used to secure the wand portion 24 to the grip 22. Though not shown herein, the prongs 46 can be clamped between two half shell portions of the grip 22 or can be secured by fasteners, plastic welding, or other suitable techniques to attach the wand portion 24 to the grip.

The grip 22 in the disclosed example also houses additional components to operate the lumen wand 20 and to provide additional functionality for the lumen wand. In this example, as depicted in FIG. 3, the lumen wand 20 has a light source or illumination element housed within the grip 22. The illumination element or light source can include or can be a light bulb or the like. The illumination element is positioned and directed to emit light into the wand portion 24, as described further below. In one example, the illumination element or light source can include or can be a light emitting diode (LED) 50. LED's are long lasting, are energy efficient, can be quite small yet powerful, and can produce a consistent light output. However, other types of light sources or illumination elements may certainly be used, if desired. In general, the emitted light enters the wand portion 24 via the proximal edge 44 and propagates along and through the wand portion. Light is then emitted from surfaces and edges of the wand portion 24, other than the proximal edge, depicted in FIG. 4 and as discussed further below.

The lumen wand 20 includes an illumination element, such as the LED 50, that is positioned adjacent the proximal edge 44 of the within the grip 22. The cavity of the grip 22 can be configured to securely hold and retain the LED 50 in the desired position. The LED 50 may be a blue LED, a white LED, an RGB LED, and RGBW LED or other type of LED, as needed to produce a desired color or brightness. If a multi-color LED is used, the lumen wand 20 can be configured to allow one to change the illumination color. Other types of light sources or illumination elements, however, may also be used, as noted above.

In this example, the LED 50 is positioned between the prongs 46 to direct light toward and into the first or proximal edge 44 of the wand portion 24. The proximal edge 44 may be optimally and concavely curved to create a lens function to shape, disperse, radiate, or otherwise direct the light into the interior of the wand portion 24. Alternatively, or in addition, a separate lens 52 may be deployed between the LED 50 and the proximal edge 44 of the wand portion 24. The lens 52 may be provided to more precisely or specifically shape the light exiting the lens and entering the wand portion 24 via the proximal edge 44. Light emitted from the LED 50 thus enters the curved proximal edge 44. The curvature of the proximal edge 44 and/or the lens 52 can direct light evenly over the proximal edge and into the wand portion 24 in a plurality of directions. The direction of each beam of light may be determined by the angle that each beam exits the LED 50 and by the angle that each beam exits the lens 52, if provided. The direction of each beam of light may also be determined by the angle that each beam hits the proximal edge 44. The direction of each beam of light may also be determined by the degree that each beam of light is refracted upon entering the body of the wand portion 24. Thus, the light emitted by the LED 50 can be evenly distributed in multiple directions within the body of the wand portion 24.

In other examples, two or more light sources and/or illumination elements may be utilized. Also, the light sources and/or the illumination elements can be located separate from or outside of the grip, such as in another component located between the lumen wand 24 and grip 22, or elsewhere on the lumen wand 20, if permissible by the design and if desired. The illumination elements and/or light sources can emit white light or can emit colored light, such as blue light, orange light, yellow light, red light, green light, or the like as well. The intended application for the lumen wand, as well as the tint or lack thereof of the lumen portion, may dictate the color of light to be emitted by the light source or illumination element.

The lumen wand 20 in this example also has a power source 54 that is configured and arranged to provide energy to illuminate the LED 50. In one example, the power source can be or can include a battery 56, such as a DC battery, a rechargeable battery, or the like. The battery 56 in this example, or another power source, can be housed in a separate compartment within the cavity of the grip 22. If desired, the battery 56 can be accessible by removing a portion of the grip 22, such as a battery door (not shown), to recharge or replace the battery as needed. Other types of batteries 56 may also be used and the power source and/or battery also need not be housed within the grip 22. The power source or battery can instead be carried elsewhere on the lumen wand or all or part of the power source can be provided remote from the lumen wand.

In the disclosed example, the power source 54 includes a charging chip 58 coupled to the battery 56. The charging chip 58 can be programmed or configured to apply various algorithms or protocols to the battery 56. The battery 56 in this example can be of the type that stays within the grip 22 and thus does not need to be removed in order to be recharged. Thus, in this example, the power source 54 can also include a universal serial bus (USB) port 60 or other type of connection port that is provided on the lumen wand 20. For example, the USB port 60 access opening (though not depicted herein) can be an accessible port on a side of the grip 22. One purpose of the USB port 60 can be to connect a charging cord to the USB port to recharge the battery 56.

The battery 56 can be of any suitable type. In some examples, the battery 56 can be a nickel-cadmium (NiCad) battery, a nickel-metal hydride (NiMH) battery, a lithium-ion (Li-ion) battery or the like, each having different charging and power dissipation characteristics. The charging chip 58 can be configured to include a protection circuit, which might typically be required to safe charge a Li-ion battery. The charging chip 58 may also regulate current and voltage, may include field-effect transistor (FET) switches to control or stop current, and may provide charge status indicators and/or battery cell balancing. The charging chip 58 may also have a time-out-timer feature that stops a charge of a defective battery, if predictable symptoms do not occur as expected during charging. The charging chip 58 may also be configured to offer pre-charge conditioning or boost to wake an inactive battery. The charging chip 58 also may offer a sleep mode that reduces the current of the circuit for the power source 54 while the battery 56 and lumen wand 20 are in storage. The charging chip 58 can be configured to open the charging circuit after the battery 56 is fully charged but before the battery is disconnected from a charger. The charging chip 58 may also be configured to provide an indication of remaining battery charge, remaining battery life, or the like.

The lumen wand 20 may also include an actuation mechanism that in this example has a switch 62 provided to operate the lumen wand, and more specifically, the light source or illumination element. In this example, the switch 62 is positioned protruding from an exposed end surface 64 of the grip 22 opposite the wand portion 24. The actuation mechanism may also employ a push button actuator 66 or other type of actuator to active or operate the switch. In other examples, the push button actuator 66 may instead be a toggle actuator, a touch sensitive actuator, a slide actuator, or other suitable actuator or device. The switch 62 and push button actuator 66 are used to turn the LED 50 on and off. If desired or needed, the switch 62 may be configured for use to perform or affect other functions of the lumen wand 20 as well. In one example, the push button actuator can be relatively large, such as about 0.75 in.×0.75 in. in size so it can be operated easily with or without gloves. In one example, the push button actuator can be used to turn the lumen wand on or off, but also to cycle through various lighting options, such as flashing, changing the color of illumination of the RGB LED 50, and the like.

The lumen wand 20 can also include a processor or microprocessor 68 housed within the grip 22. The microprocessor 68 can be programmed or configured to provide additional functionality for the lumen wand 20. The microprocessor 68 can be designed to allow for dimming or adjusting the brightness of the illumination element, such as the LED 50. The microprocessor 68, and/or the charging chip 58, can be designed to allow for controlling energy usage of the battery 56 to preserve battery life under specific circumstances. The microprocessor 68, and/or the charging chip 58, can be designed to provide a timer function to turn off the illumination element after a specified time period. The lumen wand 20 can have a motion sensor (not shown) that is coupled to the microprocessor 68, whereby the illumination element is automatically turned on or off when the lumen wand is picked up (moving) or is not being used (i.e., not moving), respectively. The microprocessor 68 can be programmed to allow one to change the color of illumination. The microprocessor 68 can be programmed to change from an "always on" mode to a flashing or "intermittent on" mode.

The lumen wand 20 can also include a small user display or touch screen (not shown) for the user to view certain operation parameters of the lumen wand such as on/off status, battery life, brightness, timer data, and the like. Such a display or screen can be provided on the exterior surface 42 of the grip 22 as well, or can be provided on another part of the lumen wand 20. Such a display or screen can also be connected to the microprocessor 68 whereby each may control functions of the other. Alternatively, or in addition, the lumen wand 20 can include a power ON/OFF indicator, such as a power LED or light 70 that is visible on the grip 22, the push button actuator 66, or another part of the lumen wand. Further, the lumen wand 20 can include a battery charge indicator, such as a charging LED or light 72 that is also visible on the grip 22, the push button actuator 66, or the lumen wand. If the lumen wand 20 is used as an airport marshalling wand for directing taxiing planes, the lumen wand may include a separate panic button (not shown) that, when pressed, can sound an alarm directly in the cabin of a plane, in the headset of the pilots, and/or in the headset of a traffic controller. The panic button can also be controlled and/or operated by the microprocessor 68. The panic button can communicate using RF signals, Wi-Fi signals, or other suitable signal technology.

The lumen wand 20 may also include a circuit board 74 to which the various components are connected. The switch 62, push button actuator 66, battery 56, charging chip 58, USB port 60, other components of the power source 54, and the illumination element or LED 50 can be connected to the circuit board and thus to one another via the board, as is known in the art. Wires may be used to connect the various components to the circuit board 74. Electrical contacts can be provided as well between the various components and the circuit board 74. The functional design of these components can vary considerably within the spirit and scope of the present invention.

Figure 4:
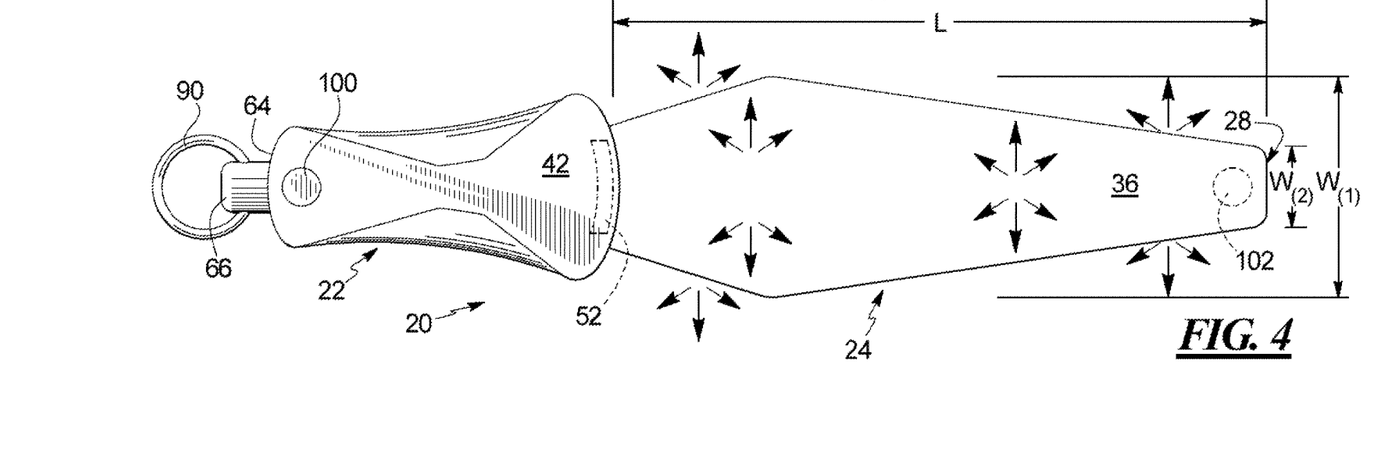
FIG. 4 shows a representative view of the lumen wand of FIG. 1 in an illuminated state.

Referring to FIGS. 3 and 4, emitted light from the LED 50 entering the wand portion 24 at the proximal edge 44 will propagate within and along the body of the wand portion Light will then be emitted by, i.e., exit the wand portion 24 over the front and rear surfaces 34, 36 and via the side edges 38, 40 of the wand portion. The light exiting the wand portion may otherwise be concentrated near the proximal segment 30 without fabricating the wand portion 24 from a high grade, expensive light pipe material or otherwise adding surface effects to the wand portion. Light pipe material and its thickness can be designed and tuned to allow light to exit the various surfaces only upon hitting the surfaces from within the body of the lumen portion at specific angles. Such a lumen wand might be relatively expensive. In the disclosed examples, the wand portion 24 may instead (or in addition) be modified to better distribute emitted light over the surfaces of the wand portion. For example, referring to FIGS. 1, 2, and 5, the front and rear surfaces 34, 36 can each include an applique, i.e., an additional layer 80 of material that is opaque, translucent, or semitransparent to light so that all light does not pass cleanly through the material but that at least some propagating light is instead reflected back into the body of the wand portion and/or absorbed by the material. The lumen wand 20 may be constructed so that light is directed from the wand portion 24 during use at specific angles or in one or more specific directions. For example, FAA and Military usage may require that the emitted light be "omni directional." The wand portion 24 can be constructed so as to meet such requirements.

Figure 5:
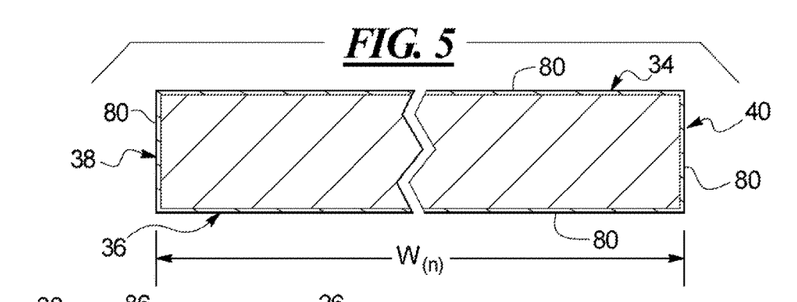
FIG. 5 shows a cross-section taken along line 5-5 of the lumen wand of FIG. 2.

The appliques or layers 80 of material can be created to match the shape of all or part of the shape of the body of the wand portion 20. The appliques or layers 80 of material to be applied may be translucent or semi-transparent. In one example, referring to FIGS. 1, 2, and 5, the applique or layer 80 may be a Diamond Grade Reflective Fluorescent Orange material, which is produced by Minnesota Mining & Manufacturing (3M). The material may be highly suitable for the disclosed lumen wand 20 because the material permits light to pass though the layer 80 and very evenly distributes the emitted light from within the wand portion 24. The material is also highly reflective of light hitting the surface of the layer 80 on the wand portion 24 from outside the lumen wand 20. Thus, the lumen wand 20 in this example is particularly well suited for day and night time use. FIG. 4 is representative of the lumen wand 24 in an illuminated state. As shown in FIG. 5, the 3M applique or layer 80 is applied to the front surface 34, rear surface 36, the side edge 38 and the side edge 40.

In one example, the wand portion can be made from a semi-transparent acrylic material. The surfaces of the wand portion, other than the proximal edge 44 where the lens 52 is disposed, can be covered with an additional semi-reflective layer of material. Such a layer may allow for some diffusion of light to provide edge illumination but also to reflect some light back into the body of the wand portion. The aforementioned 3M applique material layer 80 typically comes with such a white a semi-transparent under-layer or sub-layer beneath an orange diamond grade reflective surface, which functioned very well during testing. The under-layer can instead be a spray coating or both of the layers of material can be replaced by a suitable semi-transparent spray coating. Further, the body of the wand portion 24 may be molded with a pigment in the resin so that the material is colored, if desired.

Figures 6, 7:
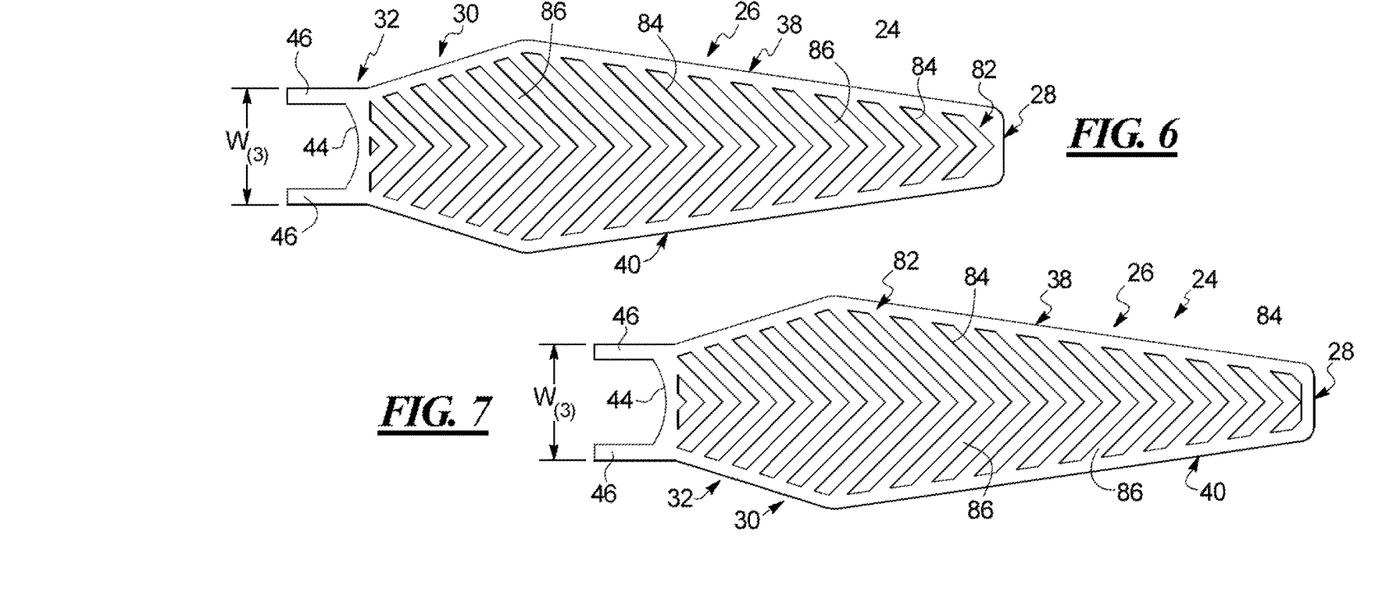
FIGS. 6 and 7 show opposite front and rear view of another example of a lumen portion of a lumen wand constructed in accordance with the teachings of the present disclosure.

The appliques or layers can also or instead be created to include specific patterns of openings, such as those shown in FIGS. 6 and 7. In this example, the material layers 82 may again be applied to the are added to the front and rear surfaces 34, 36 and optionally the side edges 38, 40 on the wand portion 24. Such material layers 82 are also provided with a pattern of openings 84 disposed between ribs 86 of the layer 82 on each surface and edge of the wand portion 24. The openings 84 through the material layers 82 and the ribs 86 in this example define a herringbone pattern for the layers 82. The openings 84 on the front surface 34 may be staggered relative to the openings 84 on the rear surface 36, as depicted by comparing FIGS. 6 and 7. Thus, if one looks through the openings 84 on one surface of the wand portion 24, the ribs 86 of the material layer 82, not the openings, would be visible on the opposite surface of the wand portion. The layers 82 of material can again be orange or can be another suitable color, depending on the desired use of the lumen wand 20. The bright orange color would render the lumen wand 20 readily visible during the day without illumination of the lumen portion. The layers 82 depicted in FIGS. 6 and 7 can be opaque or can be translucent or semi-transparent, if desired. If opaque, light will only be emitted through the openings 84. If translucent or semi-transparent, some light may be emitted through the ribs 86 and some light will be emitted through the openings 84.

The orange or other color can be selected so that the lumen wands 20 are also highly visible during the day and at night. The material layers 80 and 82 can be formed of any suitable material, such as vinyl, PVC, or the like. In one example, the herringbone patterned material layers 82 or appliques can also be formed of the above noted 3M Diamond Grade Reflective Fluorescent Orange striping. The material layers 80 and 82 may also be formed of materials that are moisture resistant, UV resistant, temperature resistant, and may also include fluorescent or luminescent, i.e., phosphorescent qualities. The material layers 80 and 82 can include an adhesive backing to easily adhere the layers to the wand portion 24. However, the material layers 80 and 82 could be attached to the lumen portion using other suitable methods and materials. Further, the material layers 80 and 82 could be applied only on the front surface 34, only on the rear surface 36, only on some or all of the exposed side edges 38, 40, or on any combination thereof. Also, the side edges 38, 40 can be modified to block all light from being transmitted therethrough, to permit any light hitting the side edges to readily be transmitted therethrough, or to permit only a desired proportion of light to be transmitted therethrough.

In another example (not shown), the surfaces of the wand portion may be textured to provide patterns of different surface features which may be configured to transmit, reflect, block, refract, or redirect light in different ways to produce desired effects. Such surface textures can be formed using any known techniques suitable for the specific material of the wand portion. In one example, the surfaces may be laser etched to form a desired surface texture. Alternatively, or in addition, laser etching may be used to internally etch the body of the wand portion to achieve the desired effect. Alternatively, surface textures could be molded into the surfaces or could be formed into the surfaces by blasting, cutting, etching, or the like. Further, a gradient-based outer coating can be applied to the surfaces of the wand portion to achieve the desired textured effect. Likewise, the surface textures can be formed only on the front surface, only on the rear surface, only on some or all of the exposed side edges, or on any combination thereof. Such surface textures may also be formed on some or all of the exposed side edges.

In still another example, the exposed surfaces of the wand portion between ribs 86 of an applique layer 82 with spaced apart openings 84 can be tinted or painted with a color, such as orange or yellow/orange. The exposed surfaces of the wand portion can be painted or tinted prior to applying the material layer 82 or the exposed areas in the openings 84 can be tinted or painted after the layer is applied. This coloring can give the emitted light a colored hue, if desired. The material of the body of the wand portion can be created with a desired color tint, if desired, as an alternative.

In yet another example, instead of an applique layer, the surfaces of the wand portion may be painted or coated with a colored material layer. The paint or coating on the wand portion can give the lumen wand a highly visible hue, such as bright or fluorescent orange, both during day when not illuminated and at night when illuminated. The paint or coating can also include a luminescent or phosphorescent characteristic. Also, the paint or coating may either be a thinner or thicker coating nearer the proximal segment that on the distal segment and/or may have a different color nearer the proximal segment that that of the distal segment.

The disclosed lumen wands may also be configured to include additional features to enhance or accommodate storage, handling, and the like. For example, referring to FIGS. 1, 2, and 4, the lumen wand 20 can include a key ring or loop 90 carried on a portion of the wand. In this example, the push button actuator 66 has a through hole for receiving the ring or loop 90. The ring 90 can be used to attach a chain, a clip, a clamp, or the like. The ring 90 can also be used to hang the lumen wand 20 from a hook. Alternatively, the grip 22 may include a through hole (not shown), which can be used to connect a ring, a chain, a tether, or the like to directly hang the lumen wand from a hook.

Figure 8:
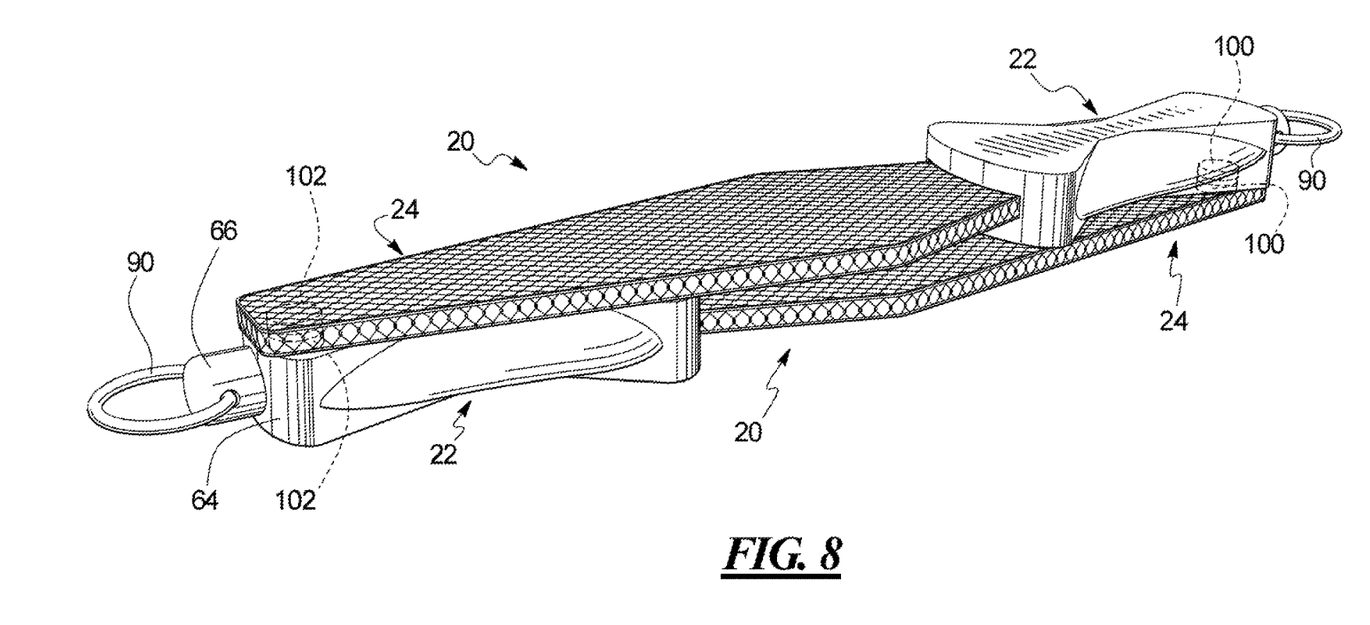
FIG. 8 shows a perspective side view of two of the lumen wands of FIG. 1, the two lumen wands attached to one another.

Referring to FIG. 8, in yet another example, the lumen wands 20 can be provided with a magnetic attachment feature. The feature may be used to connect two or more of the lumen wands together for storage or may be used to magnetically attach the lumen wand to a metallic surface for storage. As shown in FIGS. 1, 4, and 8, each lumen wand 20 may include a magnet 100 or ferrous element on or embedded in a portion of the grip 22 near the free end of the grip. Each lumen wand 20 may also include a magnet 102 or ferrous element on or embedded in the wand portion 24 near the free end 28. The magnet 100 or ferrous element on the grip 22 of one lumen wand 20 is magnetically attractive to the magnet 102 or ferrous element on the wand portion 24 of the other lumen wand. In this way, the two lumen wands 20 can be easily attached to one another, rotated 180 degrees opposite one another, for storage. The two attached lumen wands 20 can then be stored together on a surface, from a hook, from a key chain, from a belt, or the like. The thin profile of the disclosed lumen wands 20, and particularly the wand portions 24, also allows for either one lumen wand or two attached lumen wands to be stored in a pocket or pouch of a user.

The magnets or ferrous elements 102 on the tips of the wand portion 24 can be adhered to the surface of the wand and can be under the layers 80 or 82. Alternatively, the magnets or elements 102 can be recessed into the material of the wand portion 24. The magnets or ferrous elements 100 can be in-molded into the material of the grip 22, whether the plastic part or the overlying grip surface material. The magnets or elements 100 can be flush with the surface of the grip 22, protrude from the surface, or lie just below the surface.

As will be evident to those having ordinary skill in the art, the shape of the body of the wand portion 24 can vary from the examples disclosed herein. The wand portion can, for example, be a rectangle, a triangle, a truncated triangle, rounded at the corners, rounded along the side edges, elliptical, or the like. In the above-disclosed example, the lumen wand 20 in front and rear view generally mimics the appearance of a traditional cone shaped marshalling wand. Further, referring to FIG. 5, the side edges 38, 40 s of the body of the wand portion 24 are shown as being straight or square relative to the front and rear surfaces with sharp corners. The side edges can instead be rounded, or at least the corners can be rounded. The size of the lumens wands 20 can also very within the spirit and scope of the disclosure. The dimensions of the wand portion 24 in this example, which is but one of many possible examples, may be about: a) 0.25" in thickness T; b) 6.78" in length L of the distal segment 26; c) 2.19" in length L of the proximal segment 30; d) 2.96" in width W(1) at the widest point where proximal and distal segments meet; e) 1.1" in width W(2) at the free end 28 of the distal segment; f) 1.07" in length of the attachment legs or prongs 46; g) 1.16" in width W3 between attachment legs; and h) 1.24" the arc length of the lens or the proximal edge 44.

As will be evident to those having ordinary skill in the art, the disclose lumen wands or marshalling wands can vary from the examples shown and/or described herein. The wand portion can be made from a clear plastic or a tinted material. The size and shape of the wand portion can be varied considerably depending on the particular application or use intended. The wand portion and its surfaces can be modified to achieve desired light emitting effects. The wand portion can be produced as a light pipe from high grade materials or can simply function similar to a light pipe by internally reflecting a fraction of the light propagating along and within the wand portion. Component features and performance characteristics can also be altered or changed from the examples shown and/or described herein. The size, shape, type, location, and/or performance characteristics of the illumination element or light source, power source, battery, grip, wand portion, switch, push button actuator, microprocessor, and/or the like can all vary considerably.

The disclosed lumen wands have a relatively thin profile like the prior art reflective or luminescent wand noted above. However, the disclosed thin profile wand is illuminated for much better night time performance. The thin paddle-like shape of the wand portion results in the lumen wand taking up much less space than the cone shaped prior known marshalling wand while still providing all and more of the illumination benefits of such wands. The thin profile allows the lumen wand to be stored in the pocket of a user, taking up significantly less space than conventional illuminated wands. The thin profile of the lumen wands also allows two of the wands to be mated flat together, wand-to-wand, but rotated 180 degrees relative to one another or otherwise appropriately misaligned with one another. The two wands can then easily also be stored in a single pocket, pouch, or carrier. The light pipe-like functionality results in achieving a highly-illuminated wand for night time use while allowing use of a smaller, less powerful light source. Thus, the lumen wand disclosed herein may use less energy and may be smaller and lighter without giving up any performance benefits of prior known illuminated lumen wands.

The disclosed lumen wand has a flat illuminated element that is edge lit. The wand can utilize only a single light source or element, such as the LED described above. The disclosed lumen wand is configured to reflect some light within and along the length of the body of the wand portion to scatter the light. When emitted from the surfaces of the wand portion, much of the light may be emitted roughly perpendicular tot eh wand surfaces. The disclosed lumen wand emits light over the entirely of the wand portion with an omni-directional glow that far exceeds existing marshalling wand products.

Although certain marshalling wands or lumen wands and components, features, and characteristics have been described herein in accordance with the teachings of the present disclosure, the scope of coverage of this patent is not limited thereto. On the contrary, this patent covers all embodiments of the teachings of the disclosure that fairly

What is claimed is:

1. A lumen wand comprising:
   a wand portion formed of a transparent or semi-transparent material having a paddle shape with a front surface, a rear surface, a thickness, a length, and a width, the thickness being substantially less than at least the length;

a grip coupled to one end of the wand portion; and a magnet or a ferrous element carried on the grip and the other of the magnet or the ferrous element carried on the wand portion near a distal end thereof so that the lumen wand can be magnetically adhered to another lumen wand of like construction in a grip to wand portion arrangement;

an illumination element that is configured to emit light into an interior of the wand portion, wherein the emitted light is dispersed omnidirectionally from the wand portion.

2. A lumen wand according to claim 1, further comprising a power source disposed within the grip of the lumen wand.

3. A lumen wand according to claim 2, wherein the power source includes a rechargeable battery disposed within the grip of the lumen wand.

4. A lumen wand according to claim 1, wherein the illumination element is disposed within the grip.

5. A lumen wand according to claim 1, wherein the illumination element is a LED.

6. A lumen wand according to claim 1, wherein the emitted light is emitted by the illumination element into a proximal edge of the wand portion, the proximal edge being adjacent the illumination element, and wherein the proximal edge is curved concavely relative to the illumination element to direct the emitted light from the illumination element in a plurality of directions into a body of the wand portion.

7. A lumen wand according to claim 6, further comprising a lens disposed between the proximal edge and the illumination element, the lens being concave relative to the illumination element.

8. A lumen wand according to claim 1, further comprising a switch disposed within the grip of the lumen wand, the switch configured to operate the illumination element.

9. A lumen wand according to claim 8, wherein the switch is coupled to an actuator that is exposed to an exterior surface of the grip.

10. A lumen wand according to claim 1, further comprising a microprocessor disposed within the grip, the illumination element operably connected to the microprocessor.

11. A lumen wand according to claim 1, wherein a body of the wand portion is formed of a solid acrylic material.

12. A lumen wand according to claim 1, wherein side edges of the wand portion are modified to control the amount of the light emitted therefrom, the direction of the light emitted therefrom, or both the amount and the direction of the light emitted therefrom.

13. A lumen wand according to claim 1, wherein an applique layer is applied to at least a portion of the front surface or the rear surface of the wand portion.

14. A lumen wand according to claim 13, wherein the applique layer is 3M Diamond Grade Reflective Fluorescent Orange material.

15. A lumen wand according to claim 13, wherein the applique layer defines an intermittent pattern of openings on the wand portion.

16. A lumen wand according to claim 13, wherein the interior of the wand portion is a hollow interior and the emitted light is emitted from the hollow interior and the wand portion through the applique layer.

17. A lumen wand according to claim 13, wherein the applique layer substantially covers the front surface or the rear surface of the wand portion.

18. A lumen wand according to claim 1, wherein the wand portion has a body defining the interior and being fabricated from a high-grade light pipe material that is configured to reflect at least a portion of the emitted light from the illumination element along and within the interior of the body of the wand portion prior to the emitted light being emitted from the wand portion.

19. A lumen wand according to claim 1, further comprising:

a microprocessor disposed within the grip, the microprocessor configured to control one or more functions of the lumen wand;

a USB port carried by the grip;

a charging chip disposed within the grip;

a rechargeable battery disposed within the grip, the charging chip configured to control at least one aspect of recharging the rechargeable battery, the USB port configured to provide power to recharge the rechargeable battery; and an actuation mechanism disposed at least in part within the grip, the actuation mechanism configured to control the illumination element.

20. A lumen wand comprising:

a wand portion formed of a transparent or semi-transparent material having a paddle shape with a front surface, a rear surface, a thickness, a length, and a width, the thickness being substantially less than at least the length;

a grip coupled to a proximal end of the wand portion;

a first magnetic component carried on the grip and a second magnetic component carried on the wand portion near a distal end thereof; and an illumination element that is configured to emit light into the wand portion, wherein the emitted light is propagated by the wand portion such that light is emitted from surfaces of the wand portion, wherein the first and second magnetic components are configured to magnetically adhere the front surface or the rear surface of the lumen wand to a front surface or a rear surface of another lumen wand of like construction, wherein the first magnetic component of the lumen wand is configured to adhere to a second magnetic component carried on a wand portion of the another lumen wand, and wherein the second magnetic component of the lumen wand is configured to adhere to a first magnetic component carried on a grip of the another lumen wand.

* * * * *